June 5, 1928. 1,672,124
J. S. HAUG
VALVE
Filed Jan. 10, 1923 2 Sheets-Sheet 1

WITNESS:
Rob't R. Kitchel.

INVENTOR
John S. Haug
BY
Augustus B Stoughton
ATTORNEY.

June 5, 1928.

J. S. HAUG

VALVE

Filed Jan. 10, 1923

WITNESS:
Rob R Kitchel

INVENTOR
John S. Haug
BY
Augustus B Stoughton
ATTORNEY.

Patented June 5, 1928.

1,672,124

UNITED STATES PATENT OFFICE.

JOHN S. HAUG, OF PHILADELPHIA, PENNSYLVANIA, ASSIGNOR TO THE U. G. I. CONTRACTING COMPANY, OF PHILADELPHIA, PENNSYLVANIA, A CORPORATION OF DELAWARE.

VALVE.

Application filed January 10, 1923. Serial No. 611,703.

The present invention relates to valves which among other purposes are useful between the generator and carbureter or fixing chamber of a water gas set for opening and closing the conduit or pipe by which the hot producer or combustible gas is conveyed from the producer to the carbureter or fixing chamber where it is burned by association with secondary air, but it must be borne in mind that the invention includes the use of the valve in other associations in which the gases involved may be of any kind whatever.

The principal objects of the present invention are to promote rapid mixing of the secondary air with the producer gas coming from the generator and to preheat the secondary air thus producing a comparatively short flame, making it possible to light the carbureter blast quickly and to control the temperature of the carbureter closely; to avoid the introduction of the carbureter blast in such a way that it can impinge on the fire brick lining and cause deterioration of the brickwork; and to prevent overheating the valve and more particularly the seat or valve face.

Generally stated, the invention comprises means or provisions by which all of the secondary air required at this stage of the process is introduced to the producer gas through the valve body. The invention also comprises the provision of a valve casing having a mouth for the reception of secondary air and open to the axis of the fluid way of the valve for the centripetal discharge of secondary air into the stream of combustible gas passing the valve, and the invention also comprises the improvements to be presently described and finally claimed.

In the following description reference will be made to the accompanying drawings forming part hereof and in which Figure 1 is an edge view of a valve embodying features of the invention showing the same in association with a producer or generator and a carbureter or fixing chamber parts of which are broken away.

Figure 1:
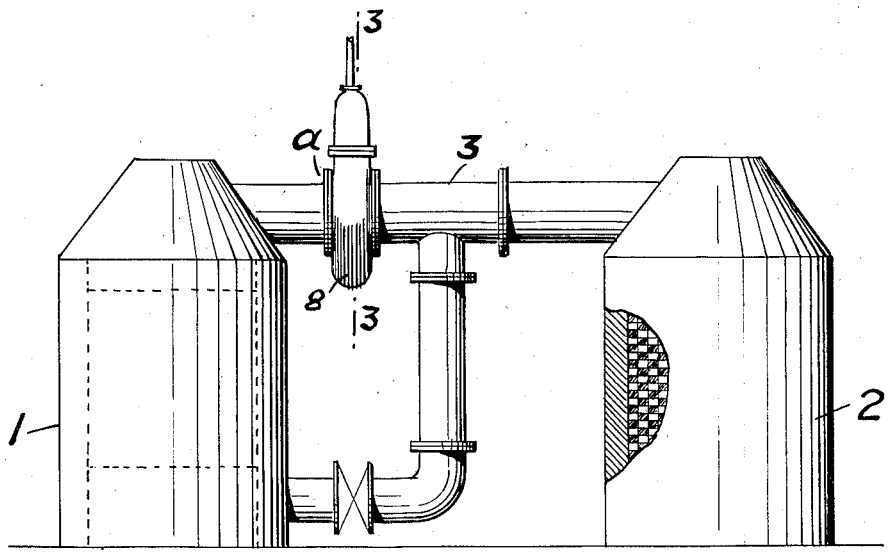
Figure 2:
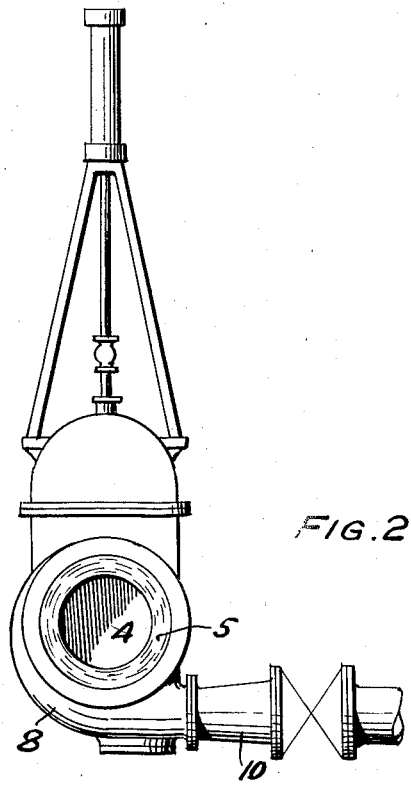
Fig. 2 is a face view of the valve drawn to an enlarged scale and showing the secondary air inlet connection to the valve which is not visible in Fig. 1.
Figure 3:
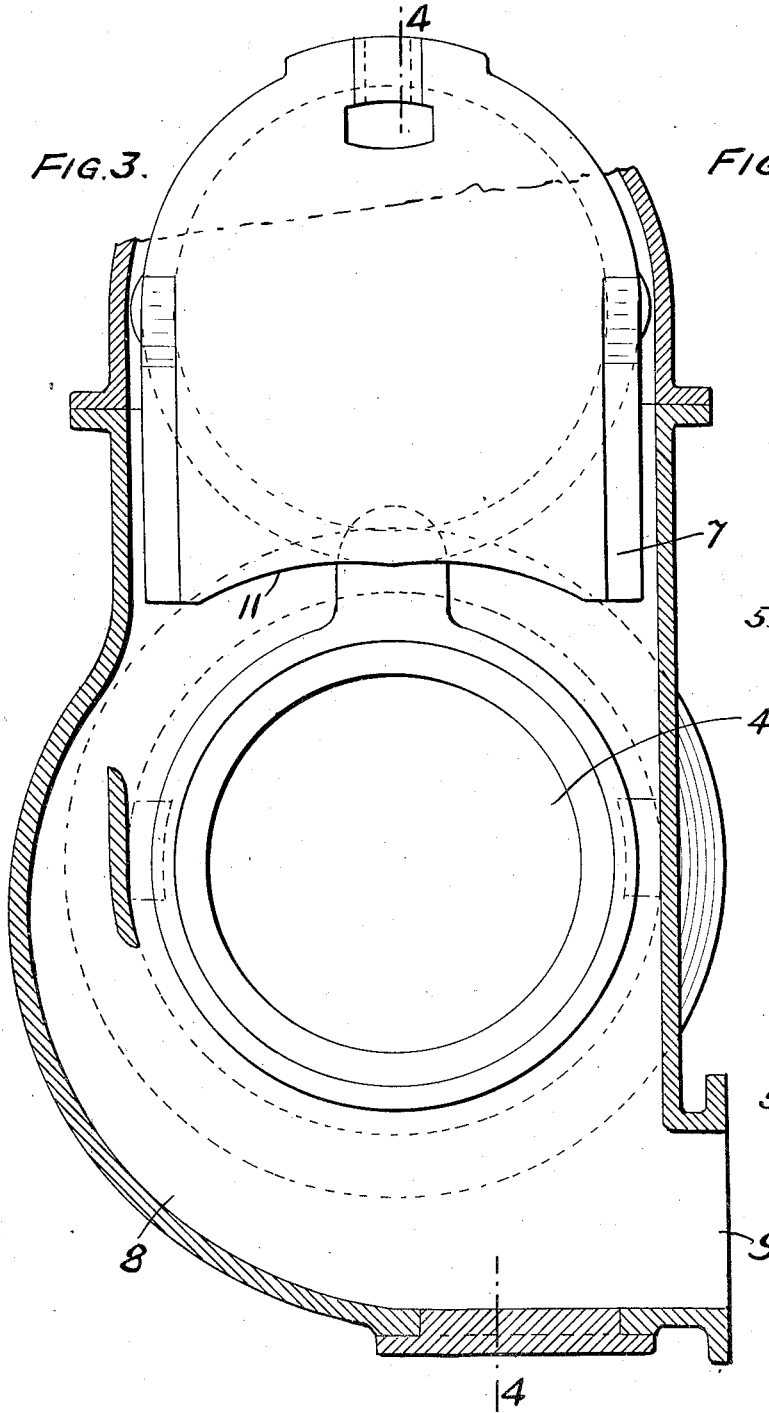
Fig. 3 is an enlarged sectional face view taken on the line 3—3 of Fig. 1 and with a part of the bonnet and superstructure removed.
Figure 4:
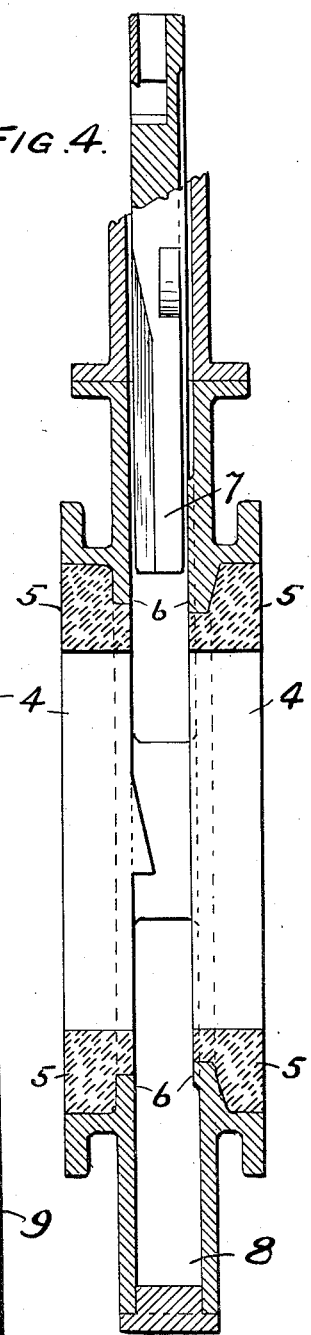
Fig. 4 is a sectional view taken on the line 4—4 of Fig. 3.

Referring to the drawings 1 is a generator or producer and 2 is a carbureter or fixing chamber which is heated by the internal combustion of the producer gas made in the generator or producer 1 by the addition of secondary air. The pipe or conduit 3 connects the elements 1 and 2 and conveys hot producer gas. There is nothing new about the apparatus of which one type has been partially described but it is believed that the present invention may be more easily understood from that description which is given for the purpose of explaining the invention. The valve of the invention is generally indicated at $a$ which is the place where what is known as the "hot valve" is generally interposed in the pipe or conduit 3. A valve embodying my invention when interposed in the pipe or conduit 3 as as $a$, may be termed a combustion valve because that describes the fact that all of the secondary air for the combustion of the producer gas at that part of the process may be introduced through it and in that way a satisfactory mixture of air and gas is obtained, the air does not impinge upon the lining of the element 3 or upon any lining in a way that would cause local overheating or erosion of the lining, and the air prevents overheating of the valve. Other beneficial results are also attained but they will be readily understood and appreciated by those skilled in the art. The valve chosen for illustration as embodying features of the invention is a slide valve and 4 is the fluid way shown as lined with refractory material 5, and 6 is the slide face or way for the gate valve or sliding element 7. There is nothing particularly new about the features of a gate valve to which reference has been made but reference to them is necessary for an explanation of the invention. 8 is a casing providing a channel of generally circular form and open to the axis of the fluid way 4, and adapted to discharge towards the center, and it may well constitute the sole inlet for all of the secondary air to the gas. The casing 8 selected for illustration while of generally circular form is of volute shape and is provided with a mouth 9 for the reception of secondary air from, for example, the air line shown at 10 in Fig. 2, but in all cases the volute shape is not necessary and additional blast inlets to the casing may be provided by merely duplicating pipe 10. A casing surrounding and open to the fluid way and to which air is supplied tangentially in respect to the axis of the fluid way has the advantage of introducing the air centripetally and with substantially uniformity all around the rim of the fluid way even at the points remote from the mouth 9. It may be remarked that when the valve element 7 is open its lower edge 11 forms a part of the wall of the passage through which the air passes. The volute shape or form promotes a thorough distribution of the air through the producer gas by the progressive reduction in area of the air channel and by the rotating flow communicated to the mixture of gas and air, and it is not in all cases essential that all of the air be introduced through the casing 8 but, as has been pointed out, there is an important advantage in doing so just as the centripetal introduction of the air to the axis of the fluid way is possessed of advantages to which reference has been made. The fact that the valve seat is substantially surrounded by air opposes overheating. The volute form has the advantage of insuring a substantially uniform supply of air, and at substantially uniform velocity of the air, at all points of the circumference.

It will be obvious to those skilled in the art to which the invention relates that modifications may be made in details of construction, arrangement and procedure without departing from the spirit of the invention which is not limited as to those matters or otherwise than as the prior art and the appended claims may require.

I claim:

1. A valve having a fluid way for producer gas and provided with a volute shaped casing having a mouth for the reception of secondary air, and said casing being open to the axis of the fluid way for the centripetal discharge of secondary air into the fluid way and said valve including a seat and a closure element for the fluidway.

2. A valve having a fluid way for producer gas and provided with a volute shaped casing having a mouth arranged crosswise of the fluid way and adapted for the reception of secondary air, and said casing being open to the axis of the fluid way for the centripetal discharge of secondary air into the fluid way and said casing including a seat and a closure element for the fluidway.

3. A valve having a fluid way and a gate element and a seat and provided with a casing of volute shape open to the axis of the fluid way and constituting an air inlet of which the lower edge of the gate element in open position of the latter constitutes a part of the bounding wall.

4. A valve having a fluid way, a seat and a closure element for the fluid way in combination with a channel element constituting a passage substantially surrounding and communicating with said fluid way, means for supplying hot producer gas through the fluid way, and a mouth structure communicating with the channel element for supplying air through said channel whereby the air cools the valve and is itself heated.

5. A valve having a fluid way and one inlet and one outlet connection for the passage of hot combustible gas, and said valve provided with a seat and closure element for the fluid way and with a channel for the passage of a cold secondary air blast and adapted to cool the valve casing and to preheat the secondary air, said channel being in communication with the hot gas fluid way for discharge of secondary air blast from substantially all points of the circumference into the hot gas fluid way and said channel element equipped with a mouth structure.

JOHN S. HAUG.